July 27, 1965

G. E. KING 3,197,157

CONTROL SYSTEM FOR USE ON V/STOL AIRCRAFT

Filed March 6, 1961

INVENTOR.
GARY E. KING

BY *Duane C. Bowen*

ATTORNEY

July 27, 1965 G. E. KING 3,197,157
CONTROL SYSTEM FOR USE ON V/STOL AIRCRAFT
Filed March 6, 1961 4 Sheets-Sheet 2
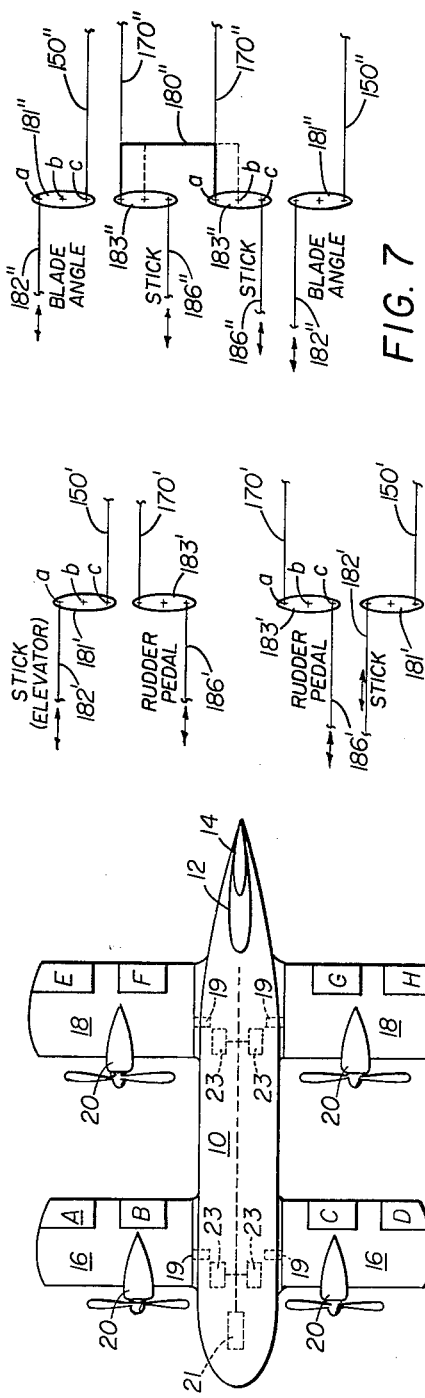
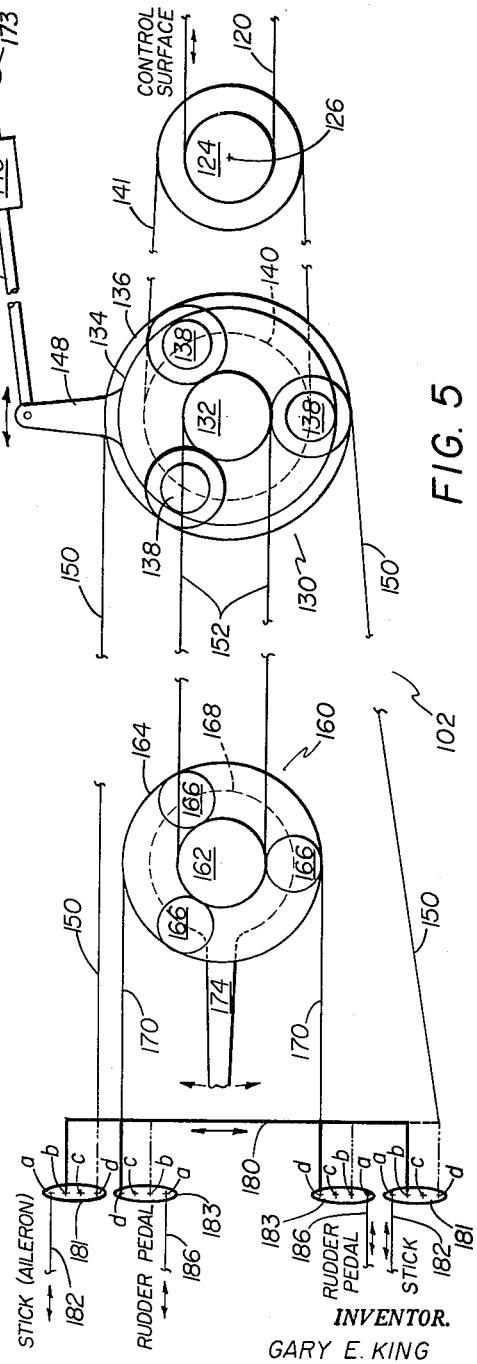
INVENTOR.
GARY E. KING
BY Duane C. Bowen
ATTORNEY July 27, 1965  G. E. KING  3,197,157
CONTROL SYSTEM FOR USE ON V/STOL AIRCRAFT
Filed March 6, 1961  4 Sheets-Sheet 3

INVENTOR.
GARY E. KING
BY *Duane C. Bowen*
ATTORNEY

INVENTOR.
GARY E. KING
BY Duane C. Bowen
ATTORNEY

United States Patent Office 3,197,157
Patented July 27, 1965

3,197,157
CONTROL SYSTEM FOR USE ON
V/STOL AIRCRAFT
Gary E. King, Wichita, Kans., assignor to Boeing Airplane Company, Wichita, Kans., a corporation of Delaware
Filed Mar. 6, 1961, Ser. No. 93,686
16 Claims. (Cl. 244—7)

My invention concerns aircraft systems for moving control surfaces and the like. My system is adapted to selectively use one or another control unit to move the same control surface. For example, in a V/STOL aircraft with pivotally mounted wings, it may be desirable to convert a control surface from use as an aileron, controlled by the stick in horizontal flight, to use in the manner of a rudder controlled by a rudder pedal in vertical flight. In VTOL and other aircraft, mixing of control may be desirable so that a control surface will function partly as a rudder responsive to rudder pedal movement and partly as an elevator responsive to stick movement, as for example in the tail control surfaces of a V-tailed aircraft. In V/STOL systems having tilting wings, my system prevents deflection of control surfaces responsive to wing pivoting while retaining normal control surface movement by a first and/or a second control unit.

These purposes are accomplished through use of epicyclic trains. To prevent control surface deflection responsive to wing pivoting, a three-gear epicyclic train is used. One element is driven by the controlling unit, e.g., the stick, the second element is connected to the control surface, and the third element is moved by a mechanism acting responsive to wing pivoting. A similar assembly is provided additionally to shift control of the control surface, as between a stick and a rudder pedal, by the use of both a four-gear and a three-gear epicyclic train interconnected so that wing pivoting results in shifting between the two control units. A single compound epicyclic gear train could be used for this purpose, but for clarity and easier understanding of the system, the two-gear train system will be described.

The problems which the invention solves include (a) the problem of control surface deflection responsive to wing pivoting, (b) the change in functions of control surfaces between horizontal and vertical flight of a pivotal wing aircraft, and (c) the general problem of mixing control between two different control units.

In one form of V/STOL aircraft, one or more wings are pivoted between generally horizontal orientation in horizontal flight and generally vertical orientation in more vertical flight, as in take-off and landing. Control surfaces usually are operated by pulleys and cable systems. In such systems, a pulley may be located on the wing's axis in order to pass the pivotal joint of the wing to the fuselage. When the wing is pivoted, the control surface cable wraps around a pulley some place in the system and the control surface is deflected. It is an object of my invention to prevent such deflection.

The system also should have other desirable characteristics such as reliability, simplicity, and low weight. Many connections may have to be made between the fuselage and the wing for various systems and therefore a compact system is highly desirable, particularly if the aircraft wing is thin. It is an object of my invention to provide these characteristics in a system meeting the other objectives.

In converting between horizontal and vertical flight, control surfaces often change function, i.e., between aileron and rudder or between elevator and rudder. Power plants also may have control functions in vertical flight, e.g., prop pitch or engine speed of one or more engines may be varied. The control surface that is stick controlled or a motor that is throttle controlled in horizontal flight may need to be responsive to rudder pedal and stick movement, respectively, during vertical flight. During flight transition when the wing may be, for example, in a 45° position, mixing of functions may be desirable. For example, a control surface may need to move partly responsive to rudder pedal movement and partly responsive to stick movement. The mechanisms and systems that perform these shifting and mixing functions should have the characteristics listed above of reliability, simplicity, low weight and compactness, and it will be obvious after a study of the drawings and written description that these objectives best may be accomplished by integration with the system just previously described. It is an object of my invention to provide such function changing and mixing capabilities in my control system.

Other types of aircraft than those mentioned have need for mixing of functions of aircraft mechanisms. For example, a V-tailed aircraft may have control surfaces with both rudder and elevator functions. The control surfaces move responsive to rudder pedals and to fore and aft movement of the stick. It is a further object of my invention to provide a system for mixing the response of a control surface or the like responsive to more than one control unit. My control system is adaptable to interposition of trim motors in some of the mechanisms to perform trim functions and it is an object of my invention to adapt the control system to provide this additional capability. The system shown and described has some applications other than use in pivoting wing aircraft, as will be understood by those working in the art after reading the description, and it is an object of my invention to provide a system useful in such other aircraft and non-aircraft applications.

The structures of the invention, the problems to be solved, the method of solution, and the objection and advantages of my invention will be further discussed below. The drawings of specific embodiments of my invention include:

FIGURE 4 is a plan view of the aircraft shown in FIGURE 3;

FIGURE 5 is a view showing schematically a system for preventing control surface deflection due to wing tilting and for changing or mixing control surface function responsive to wing tilting;

Figure 8:
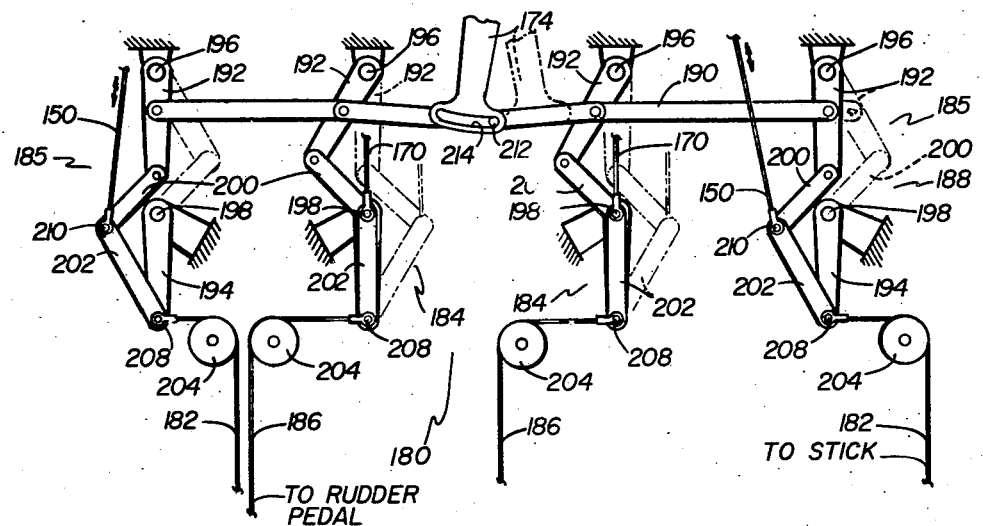
Figure 9:
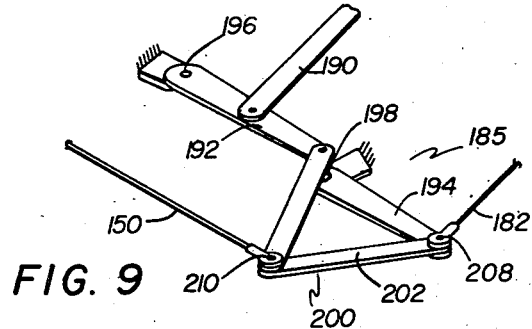
Figure 10:
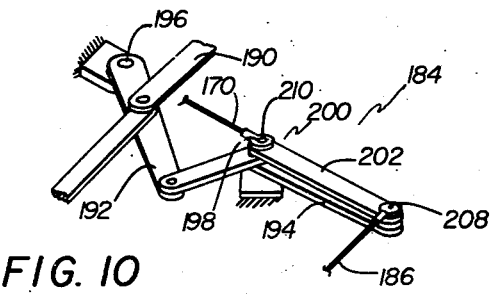
Figure 11:
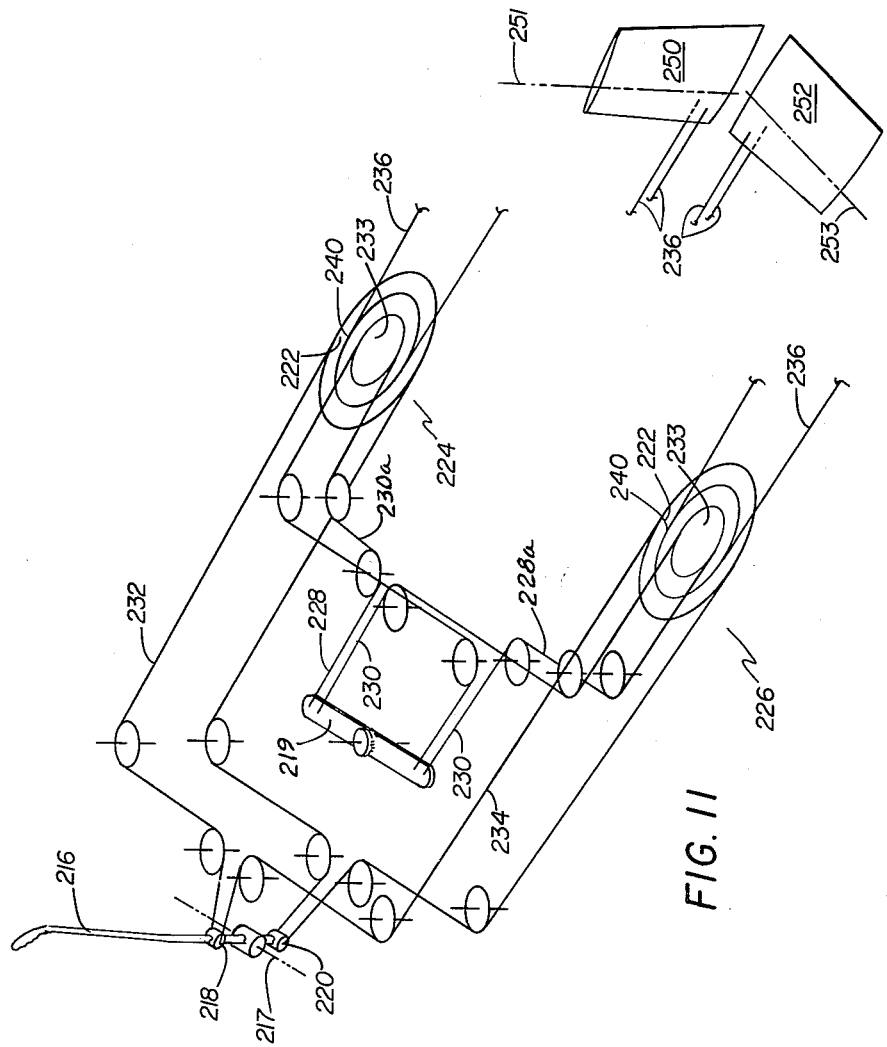

FIGURE 6 schematically shows changing between or mixing of elevator and rudder controls for the same control surface;

FIGURE 7 is a view similar to FIGURE 6 in which propeller blade angle or pitch normally controlled by a manual control cable is convertible to stick control during vertical flight;

FIGURE 8 is a plan view of a shifter mechanism operable by wing pivoting to shift response of a control surface from one control unit to another;

FIGURE 9 is a prespective view of one shifter means in a position operable to transfer motion;

FIGURE 10 is similar to FIGURE 9 but showing the shifter mechanism in a position inoperable to transfer motion; and FIGURE 11 is a perspective schematic of a control system utilizing my invention to achieve elevator and rudder control in a V-tail aircraft.

The description of the invention will have the following orders: (a) a description of a type of V/STOL aircraft, (b) a description of a simple system for preventing control surface deflection during wing pivoting, (c) a description of a more complex system including changing and mixing control functions, and (d) a description of a control system for a control surface of a V-tail aircraft.

Pivoting wing aircraft

One basic problem to which the invention is addressed is the provision of a control system for a control surface on a wing operated by mechanical motion transmitting means from a control unit in the fuselage, the wing being mounted on the fuselage to pivot about a pivotal axis generally longitudinal of the wing and transverse of the fuselage. The control surface will pivot relative to the wing responsive to pivoting of the wing relative to the fuselage unless compensating means are interposed in the mechanical motion transmitting means. The term mechanical motion transmitting means is used to distinguish hydraulic and electrical control means wherein this problem is not present. More broadly, the problem is the control of an adjustable member mounted on a first body which is pivotally mounted on a second body, the adjustable member being operated by a mechanical motion transmitting means from a control unit on the second body.

Figure 3:
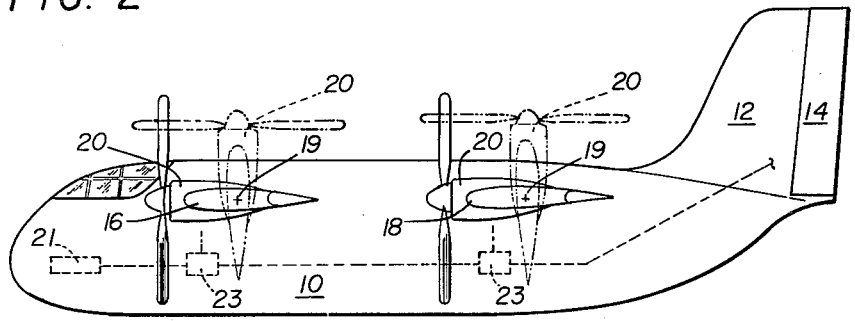
FIGURE 3 is a side elevation view of an aircraft having two pivotal wings shown in horizontal position in solid lines and shown in pivoted position in dash lines, the general control system being shown schematically in dash lines.

FIGURES 3 and 4 indicate one type of pivoting wing aircraft, one having forward and rearward wings 16, 18, both of which are pivotable about the axes of pivotal joinder means 19 with fuselage 10. Fuselage 10 is more similar to conventional aircraft than the wing and tail structures. A vertical stabilizer 12 has a rudder 14. In vertical flight the rudder will be relatively ineffective to control flight direction and yaw. Wing 16 is located far forward and wing 18, in a rear position, acts partly as a horizontal stabilizer. The control surfaces on rear wing 18 function partly as elevators. The aircraft controls, i.e., stick and rudder pedals, are symbolized by a box at 21. The mechanisms of the present invention, including epicyclic gear trains, for compensating for wing pivoting in the control system and for changing from one control unit to another in controlling control surfaces and propeller pitch, are symbolized by boxes 23.

Forward wing 16 has control surfaces A, B, C, and D, and rear wing 18 has control surfaces E, F, G, and H. According to the design selected, in horizontal flight any of these surfaces can act partly as ailerons governing roll, all can act as flaps, and any of the rear control surfaces E, F, G and H can act as elevators. Of course some control surfaces will be more effective than others for these functions. According to one design, control surfaces A, D, E and H are used as ailerons and flaps in horizontal flight, control surfaces F and G are used as elevators and flaps, and surfaces B and C are used only as flaps.

In vertical flight control surface functions change. For directional control, surfaces A, B, E and F are pivoted aft responsive to right pedal and surfaces C, D, G and H are pivoted forward. Responsive to left pedal, surfaces A, B, E and F are pivoted forward and surfaces C, D, G and H are pivoted aft. Rudder 14 preferably moves responsive to movement of the rudder pedals in all modes, but its effectiveness decreases during transition from normal flight to vertical flight. Control in VTOL flight is also exercised through the power settings of engines 20 and through change in propeller blade pitch. This control is exercisable, according to the particular design, by stick and rudder pedals. The mechanism of the present invention, including the planetary gears, is usable to shift between regular and VTOL controls of engine power and propeller pitch, as will be understood from the description below.

Control during STOL and transitional flight with small angles of wing pivoting may be similar to regular flight in most respects, although it may be modified. Surfaces F and G pivot upwardly responsive to rearward movement of the stick and pivot downwardly responsive to forward movement of the stick, Surfaces E and A pivot upward and H and D pivot downwardly responsive to right stick, and E and A pivot downwardly and H and D pivot upwardly responsive to left stick.

Control surface deflection due to wing pivoting

Figure 1:
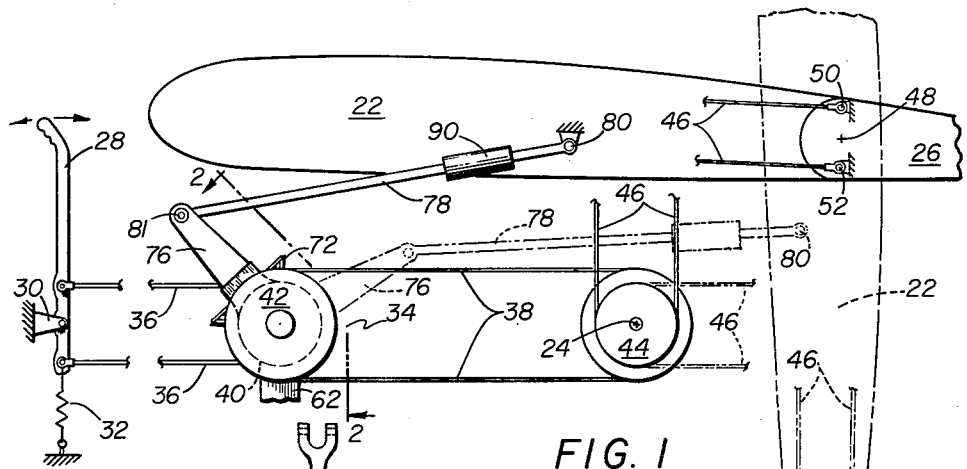
FIGURE 1 shows, in schematical, fragmentary form, a simple planetary bevel gear train and associated system permitting pivoting of an aircraft wing between horizontal and vertical positions with neither control surface deflection nor feedback movement to the control unit.

Use is made in the present system of epicyclic trains. One type is shown in FIGURE 1 and another in FIGURE 5. The assemblies are described hereafter as being mounted in the fuselage, particularly because of space availability, although they could be mounted in the wing. According to the definition of epicyclic trains, one gear or comparable element moves about the periphery of another. An epicyclic train has the capability of differential output motion and the present system utilizes that function. The epicyclic trains shown in FIGURE 1 and at the left in FIGURE 5 are three-gear systems whereas the train shown at the right in FIGURE 5 is a four-gear system. The three gears at the left in FIGURE 5 are a sun gear, planet gears and a ring gear, whereas at the right in FIGURE 5 the gears are a sun gear, compound planet gears and two ring gears. The planet gears are not used directly for the input and output of motion. The pivotal input-output elements are the sun gears, the ring gears, and the carriers supporting the planetary gears in FIGURE 5, and the two side bevel gears and the support for the third central intermeshing bevel gear in FIGURE 2.

Figure 2:
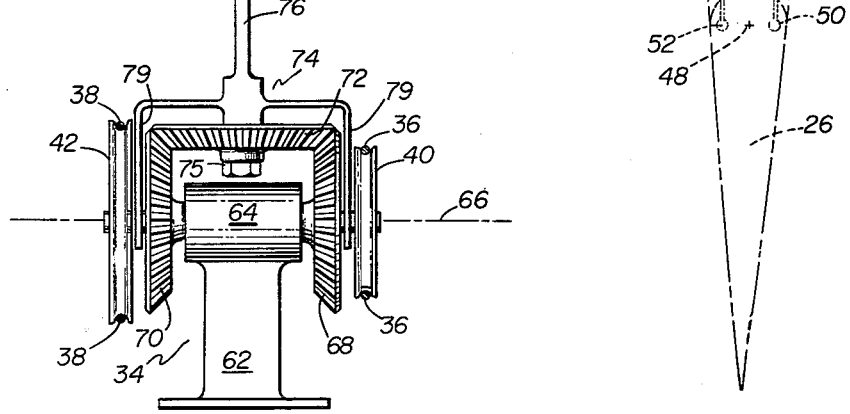
FIGURE 2 is an enlarged elevation view of the gear assembly taken on line 2—2 of FIGURE 1.

Referring to FIGURES 1 and 2, wing 22 is mounted on a fuselage to pivot about an axis 24 between the full line horizontal position and the dash line vertical position. The wing pivot axis 24 shown is not within the wing envelope in side view, although it could be in other designs. A pivotal control surface 26 on wing 22 has an elevator function and is responsive to fore and aft pivoting of stick 28. Stick 28 has a pivotal support 30 and is biased toward a neutral position by a Q-spring 32. Normal motion transfer means between a stick and a control surface would be a straight cable run. In my invention an epicyclic train 34 is interposed in the system and connects with cables 36 and 38. Cable 36 is pivotally secured to stick 28 at opposite sides of pivot 30, and wraps round a pulley 40 of the epicyclic train 34. Cable 38 wraps around pulley 42 of train 34 and around pulley 44 on wing pivot axis 24. Motion is then transmitted by cable 46 wrapped about pulley 44 to control surface 26. Cable 46 is attached to control surface 26 on opposite sides of the control surface hinge 48, as at 50, 52. Cable 46 in extending from pulley 44 to control surface 26 in wing 22 may pass about several pulleys which are not shown. The principles of the present invention can be used with mechanical motion transmitting other than cables, such as linkages of rigid stock, but cables have been found most satisfactory, partly in weight savings, in most aircraft applications where mechanical motion transmitting means are needed for long runs.

Pivoting of wing 22 from the full line horizontal position to the dash line vertical position as shown in FIGURE 1 will wrap cable 46 about pulley 44 and, unless compensated, will deflect control surface 26 or feed back movement to control stick 28. This deflection is avoided by us of the epicyclic train of the present system as explained below.

Epicyclic train 34 has a base 62 having a bearing 64 supporting a first bevel gar 68 connected to pulley 40, and a second bevel gear 70 connected to pulley 42. Meshed with side bevel gears 68, 70 is a central planet bevel gear 72. A support 74 rotatably supports gear 72 and is free to pivot about axis 66 of pulleys 40, 42 and gears 68, 70. Planet gear 72 is supported by a bearing, not shown, and is secured by a nut and washer assembly 75. Gear 72 is free to rotate on its axis and to travel about the faces of side bevel gears 68, 70. Support 74 is pivotally supported by paired arms 79 journaled on the shafts for pulleys 40, 42. The support includes a radially extending arm 76 for input of motion to the axis of gear 72. Support 74 corresponds to the spider carriers in the epicyclic trains of FIGURE 5. Motion to arm 76 is imparted by a link 78 having one end pivotally connected to arm 76 at 81 and having its other end connected to a pivot 80 on wing 22. The system including support 74, arm 76 and link 78 may be termed wing pivoting compensating means.

The operation of the FIGURES 1 and 2 systems is as follows: Control movement from the control unit, stick 28, is transmitted to move control surface 26 by action of cable 36 to rotate gear 68. As arm 76 is stationary except when the wing is being pivoted, rotation of bevel gear 68 merely rotates planet gear 72 about its axis, resulting in opposite rotation of bevel gear 70 thereby imparting movement to cable 38. This motion is transmitted through pulley 44 to cable 46 which moves control surface 26.

Although the system is operative to accomplish normal control surface movement through movement of stick 28 during wing pivoting, let it be assumed for simplicity of description of the wing pivoting compensating means that control stick 28 is not being moved during wing pivoting. As control surface 26 is to remain in the same position relative to wing 22 it has when wing pivoting commences, which may be in neutral or deflected position, wrapping of cable 46 about pulley 44 must not occur and, therefore, pulley 44 must be rotated in the direction of wing movement, e.g., pulley 44 is stationary relative to wing 22. This would feed movement back to stick 28 through cables 38, 36 if the motion were not compensated in gear mechanism 34, and such stick movement must not occur.

As cable 38 moves as pulley 44 pivots with wing 22, bevel gear 70 rotates. Unless middle gear 72 walks around the side gears, bevel gear 68 will rotate and deflect stick 28. Planetary gear 72 does walk around the side gears as it has movement imparted thereto by link 78 moving with wing 22. It will be understood, therefore, that deflection of the control surface or the stick will not occur provided the number of gear teeth in the bevel gears, the size of pulleys 44, 42, the lengths and angles of the members such as arm 76 and link 78, and the placement of the parts are such that the compensating movement of planetary gear 72 is right. Provision of these relationships is a straightforward design problem and need not be further detailed in the present disclosure. To describe the action in another way, stick 28 is spring biased to a neutral position. Link 78 inputs motion to train 34 during wing pivoting and this motion is fed to cable 38 rather than to cable 36 because of the spring resistance of the stick. Motion of cable 38 rotates pulley 44 in an amount equal to the tendency of control surface cable 46 to wrap around pulley 44 in the absence of this rotation of pulley 44, whereby control surface 26 is not deflected by the wing pivoting action.

The system also has provision for control surface trim, the trim function being the act of moving control surface 26 for trim purposes without affecting the centered or neutral position and normal action of stick 28. A trim motor 90, interpositioned in link 78, is operable to extend or retract link 78. Motor 90 may be of any type, e.g., electrical or hydraulic, and preferably would be an electrical system in which control of extension and retraction of link 78 is exercised through a switch on control stick 28 and/or signals from an autopilot. For example, extension of link 78 through operation of trim motor 90 will move planetary gear arm 76 counterclockwise as viewed. For control stick 28 to remain stationary, gear 70 and pulley 42 must rotate counterclockwise. This movement is transferred through cable 38, pulley 44, and cable 46 to deflect control surface 26 upward.

*Changing and mixing control*

As earlier indicated, a number of control units 21, such as stick, rudder pedal and throttle, act to move rudder 14, control surfaces A, B, C, D, E, F, G and H, engine fuel feed, and propeller pitch control for engines 20. During transition between horizontal and vertical flight, these functions variously are changed and/or mixed. Mixing is defined as the response of a control surface or the like to more than one control unit at one time. Depending on design, mixing may be in equal or unequal proportions between the two control units. Responsiveness will be less during mixing than at other times unless specifically compensated by the design.

Epicyclic gear train assemblies, such as the system 102 in FIGURE 5, are used both to compensate for wing pivoting and to mix or change between control units. Assemblies 102 may be centralized or located near the pivotal joints 19 between wings and fuselage. If two control surfaces such as F and G are to have the same movements, a single system such as 102 will suffice for both but they may be divided. In FIGURES 3 and 4, there are four locations 23, shown schematically, of epicyclic gear trains 102, but this may be varied according to design selection and the requirements of the particular aircraft.

In FIGURE 5, system 102 has an output in the form of a cable 120 to a control surface, which, for example, operates as an aileron controlled by stick in normal flight and is controlled by rudder pedal in vertical flight. Cable 120 wraps about a pulley 124 centered on the wing pivot axis 126 in the same manner that pulley 44 has its center 24 on the wing pivot axis in FIGURE 1.

A four-gear epicyclic train 130 has a sun gear 132, a pair of ring gears 134, 136, a plurality of planet gears 138 engaging the sun gear and the ring gears, and a spider carrier 140 supporting the planet gears. Although pulleys are associated with the sun and ring gears and carrier, for simplification the cables are shown as directly connecting to cable and other input-output elements. It may be assumed that the cables wrap around identical diameter pulleys juxtaposed to these elements. Although FIGURE 5 shows epicyclic train 130 having dual diameter planet gears 138 engaging ring gears of different diameters, this selection is for clarity of illustration, to avoid superimposing identical diameter parts, and planet gears 138 may not have dual diameters and ring gears 134, 136 may have equal diameters. As two of the input-output elements of three-gear train 160 and four-gear train 130 merely transfer movement between the trains, a compound train having five input-output elements is equivalent, i.e., the assemblies could be the same except for sharing the same sun gear. The two train system was selected for clarity of description. In any case, the epicyclic train means has but five input-output elements transferring motion external of the train means.

Train 130 may be best understood by comparing it to the structure of FIGURE 1 as most elements and functions will be the same. Cable 141, connecting pulley 124 to carrier 140, serves the same function as cable 38 connecting pulley 44 to pulley 42 in FIGURE 1. Extendible link 144, trim motor 146 and arm 148 extending from ring gear 134 in FIGURE 5, comprising wing pivoting compensating means, have the same function as link 78, trim motor 90, arm 76 and support 74 for planet gear 72 in FIGURE 1. Cable 150, connected to the stick (not shown) and to ring gear 136, and feedback cable 152 connecting sun gear 132 and sun gear 162 of three-gear epicyclic train 160, next to be described, have partly the same function as cable 36 connecting bevel gear 68 to stick 28 in FIGURE 1.

The second assembly in system 102 is a three-gear epicyclic train 160 having a sun gear 162, a ring gear 164, and a plurality of planet gears 166 supported by a carrier 168. A shifter arm 174 extends from carrier 168. The purpose of shifter arm 174 is to convert, through a shifter mechanism to be described later, from control of the control surface as an aileron by cable 150 from the stick (responding to stick sideways movement), to control by movement of rudder control cable 170 from the rudder pedal.

Following a similar operational cycle to that of FIGURE 1, cable 182 moves as the control stick is moved. Cable 182, operating through the shifter mechanism, actuates cable 150 thereby rotating ring gear 136. Ring gear 134 is fixed because of its attachment to a pivot 173 on the wing. If ring gear 136 rotates clockwise, planet gears 138 walk around ring gear 134 in a counterclockwise direction, while rotating on their axes clockwise. This rotates carrier 140 counterclockwise, thereby moving cable 141, rotating pulley 124, and moving cable 120, thereby moving the control surface.

Simultaneously, sun gear 132 is rotated counterclockwise by planet gears 138. Sun gear 132 is connected to feedback cable 152, the movement of which will rotate sun gear 162 counterclockwise. Ring gear 164 cannot rotate at this time for it is connected to cable 170 which cannot move in this position of the design shown in FIGURE 8. Since ring gear 164 cannot rotate, planet gear 166 rotated by sun gear 162 will walk around ring gear 164 counterclockwise while rotating clockwise on their axes. Carrier 168 will rotate counterclockwise, moving arm 174 which connects to the shifter mechanism symbolized at 180 in FIGURE 5. The design of shifter mechanism 180 is such that maximum control movement alone, through feedback cable 152, will not perform the shifting function. The shifting function can be accomplished only by a selected angle of wing pivoting.

Presuming instead wing pivoting with no input of control movement, ring gear 134 is pivoted clockwise with the wing because of the connection of arm 148 and link 144. Planet gears 138 will walk around ring gear 136 counterclockwise while rotating clockwise about their axes. This rotates sun gear 132 and carrier 140 counterclockwise. Carrier 140 and pulley 124, connected thereto by cable 141, will rotate at such a ratio to the wing rotational rate, that wrapping of control cable 120 about pulley 124 is prevented. Arm 174 is moved through rotation of sun gear 132, movement of feedback cable 152 and action of epicyclic train 160 in the manner as described above in normal control stick movement but in an even greater movement sufficient to perform a control shifting function in shifter mechanism 180 as will be later described.

Any movement of the control stick during wing pivoting, before shifting to control by the rudder pedal, will act to deflect the control surface to the same extent that would occur if the wing were stationary.

If it be presumed that control of the control surface is shifted during transition from horizontal to vertical flight from response to stick cable 150 to response to rudder pedal cable 170, cable 150 becomes fixed and control motion is from cable 170 rotating ring gear 164. Presuming shifter arm 174 to be stationary, rotation of ring gear 164 results in rotation of sun gear 162, movement of feedback cable 152, rotation of sun gear 132, rotation of carrier 140, movement of cable 141, rotation of pulley 124, and movement of control surface cable 120.

Changing from control surface movement by stick cable 150 to control surface movement by rudder pedal cable 170 is accomplished by shifter mechanism 180. Shifter mechanism 180 will be detailed in connection with FIGURES 8, 9, and 10 but are schematically indicated in FIGURE 5.

Pivotal bodies 181 for cables 182 and 150 and pivotal bodies 183 for cables 186 are used in FIGURE 5 to represent more complex assemblies in FIGURE 8 in which the pivotal centers shift relative to the points of attachment of the cables. These pivot points are represented as $a$, $b$, $c$ and $d$. The effective pivot point is at $b$ for pivotal bodies 181 and at $d$ for pivotal bodies 183 in the full line position of shifter mechanism 180, before shifting. The effective pivot point is at $d$ for pivotal bodies 181 and at $b$ for pivotal bodies 183 in the dash line position of shifter mechanism 180, after shifting.

When the pivot point of pivotal body 181 is at $b$, before shifting, force applied through cable 182 from the stick results in pivoting of the body and application of force to cable 150. When the pivot point of pivotal body 181 is at $d$, after shifting, force applied through cable 182 from the stick results in pivoting of the body but no application of force to cable 150 as the cable attachment point is substantially aligned with the axis of pivoting. Spring means acting on pivotal bodies 181 may be used to prevent slack in cable 182 when, in shifted position, the pivotal axis is at $d$. Similar to the above, rudder pedal cable 186 will not apply force to cable 170 when the pivotal axis of body 183 is at $d$, and cable 186 will apply force to cable 170 when the pivotal axis of body 183 is at $b$.

Mixing of stick and rudder pedal is illustrated by pivotal axis position $c$. If shifter mechanism 180 is operated to position the pivotal axes of both bodies 181 and 183 at $c$, both the stick, operating through cable 182, and the rudder pedal, operating through cable 186, will operate to move the control surface. Note that the control surface is less responsive to stick cable 182 if the pivotal axis of pivotal body 181 is at $c$ rather than at $b$. Such mixing normally would occur at some intermediate wing position, i.e., 45°, between horizontal and vertical disposition. If such mixing is undesirable and it is desired to shift instantaneously between stick control and rudder pedal control of the control surface, this can be provided by one of various common mechanical devices, i.e., having a lost motion connection between shifter arm 174 and following mechanism and having a spring in the connection so that the mechanism is thrown between stick and rudder pedal control extreme positions.

FIGURE 6 briefly indicates mixing between elevator and rudder controls, e.g., the stick and the rudder pedal, for a control surface normally operating as an elevator and operating in vertical flight as a rudder. For convenience in comparison with FIGURE 5, the comparable parts are given reference characters 150′, 170′, 181′, 182′, 183′ and 186′. Only three pivotal axes $a$, $b$ and $c$ for bodies 181′ and 183′ are given to indicate absence of a mixing position. (Pivotal axes $a$ are theoretical and are not used in the FIGURE 5 and FIGURE 6 operations described, although they could be used for lost motion positions in the same manner as point $d$ in FIGURE 5 and point $c$ in FIGURE 6.)

FIGURE 7 indicates an arrangement similar to FIGURES 5 and 6 by which control of propeller blade angle, normally responsive to a blade control cable 182″, is converted to stick control during vertical flight. For convenience of comparison, functional equivalents of that shown in FIGURE 5 are given the reference characters 150″, 170″, 180″, 181″, 182″, 183″ and 186″. If it is desired at all times to retain control of blade angle through control cables 182″, the shifter mechanism can act only on the pivotal axes of pivotal bodies 183″ and the pivotal axes of bodies 181″ can remain at $b$. This is illustrated in FIGURE 7 in which shifter mechanism 180″ operates only on pivotal bodies 183″.

*Shifter mechanism*

Various mechanisms may be used for the shifter function and may be designed to provide or avoid mixing, to shift between control units at any selected angle of wing pivoting, or may add one control medium to another rather than complete substitution. FIGURES 8, 9 and 10 illustrate one type of shifter mechanism usable in the FIGURES 5-7 systems. Adaptataion of the design to particular aircraft and systems requirements and peculiarities will be understood by those skilled in the art.

FIGURE 8 shows somewhat schematically the shifter mechanism 180 used to perform the shifting functions heretofore explained. Four structurally identical shifter devices 184, 185 are shown in FIGURE 8 in juxtaposed relationship, operatively connected to one another by an articulated shifter link 190. Shifter devices 184, 185 are similar to mechanisms shown in Patents 2,836,967-8. Shifter devices 185 are shown on the outside and correspond to pivotal bodies 181 in FIGURES 5-7. Shifter mechanisms 184 are on the inside and correspond to pivotal bodies 183 in FIGURES 5-7. Devices 185 are shown in a motion transmitting position while inner shifter devices 184 are shown in locked or non-motion transmitting position. A pin 212 extending from shifter link 190 and engaging an arcuate slot 214 in the end of shifter arm 174 provides the desirable lost motion previously mentioned.

The parts of shifter devices 184, 185 will be given the same reference characters. Two arms 192, 194 are pivotally connected to structure at 196, 198 respectively. The outer ends of arms 192, 194 are connected by an articulated link 200 one portion 202 of which is equal in length to arm 194. Control cables 182, 186, which may turn about grooved pulleys 204, are pivotally connected to the end 208 of arm 194. Cables 150, 170, to the epicyclic train system, are pivotally connected to center joint 210 of link 200.

The purpose of the shifter mechanism as previously stated is to provide means whereby a control surface can be changed from one control unit to another during wing pivoting, i.e., an aileron can be changed from stick control to rudder pedal control, or the controls can be mixed. In FIGURE 8, the outer shifter devices 185 are shown in a position whereby actuation of the control surface through cable 150 is accomplished by movement of the stick through cable 182. If cable 182 is moved clockwise as viewed, cable 150 will move counterclockwise. The two inner shifting devices 184 in the position shown will not transmit motion from rudder pedal cable 186 to the cable 170 for the epicyclic gear train and there can be no feedback to the rudder pedal through the system. The rudder pedal is, however, free to operate in its normal manner. Pivotal joints 198 may be spring biased to press arms 194 to prevent slack in cable systems 182, 186 when devices 184, 185 are in locked position, or the slack can be compensated elsewhere in the system.

With shifter means 185, 184 in the positions indicated by dash lines, the opposite to the above occurs, e.g., cable 186 from the rudder pedals is effective and cable 182 from the stick is ineffective. In a position intermediate the full and dotted line positions of shifting devices 185, 184, mixing would occur, e.g., both cables 186 and 182 would be effective. The responsiveness in this mixing condition depends on trigonometrical and other relations but in the design shown the response to movement of cables 186, 182 would be less in mixed position than in full operating condition. Mixing can be substantially avoided if the mechanism is adapted for delayed action and snap of pin 212 from one limit to the other limit of slot 214.

In the full line position of shifting means 185 in FIGURE 8, movement of cable 182 results in pivoting movement of point 210 (to which cable 150 is connected) about pivot 198. Pivot 198 can be said (a) to have position b of body 181 in FIGURE 5 when in the operating, full line position in FIGURE 8, (b) to have position d of FIGURE 5 in the non-operating dash line position in FIGURE 8, and (c) to have position c of the axis of body 181 in FIGURE 5 in a position intermediate full and dash line positions in FIGURE 8. Pivot 198 does not move but the rest of the shifting means 185 move relative to pivot 198 to accomplish the action symbolized in FIGURE 5. In the dash line position of shifting means 185 in FIGURE 8, it will be understood that pivoting of arm 194 and portion 202 of articulated link 200, responsive to movements of cable 182 to the stick, will not result in movement of cable 150 as the end 210 of cable 150 will be substantially aligned with the axis of pivoting, axis 198.

It will be understood that suitable cable tension devices, slack adjustors and other miscellaneous control system hardware not shown will be used in a working control system.

*Figure 11*

In some control systems, it is desired to feed two control inputs into a system to be mixed into one output. An example of this is the combined elevator and rudder functions of the two control surfaces of a V-tailed aircraft. In such configuration the control surfaces must serve both rudder and elevator functions and must respond both to stick and/or rudder pedal movements. FIGURE 11 shows the adaptation of my epicyclic gear train system to this application. The new system is reliable, compact and of low weight.

FIGURE 11 shows a conventional stick 216, a rudder pedal bar or yoke 219 to which the rudder pedals are secured, two three-gear differential control drums 224, 226, two tail control surfaces 250, 252, and cables interconnecting these components. The two control surfaces 250, 252 are in an upright V pivoting about axes 251, 253 as will be understood by those skilled in the aircraft art. The entire system may be regarded as two interconnected individual systems, one to each control surface, operating from a common stick and common rudder bar. The control surfaces, and the individual systems associated therewith, operate oppositely in rudder function and operate together in elevator function. Epicyclic trains 224, 226 are shown schematically and the cables are shown as connecting directly to gears and the like, although in practice there will be pulleys associated with the sun and ring gears and carriers.

Considering first the elevator function, two cables 232, 234 are attached at one end at 218 to stick 216 on one side of the stick pivotal axis 217. The other end of cables 232, 234 attach at 220 to the opposite side of the stick's pivotal axis 217, thereby forming closed loops. Cables 232, 234 are wrapped in the same direction about ring gears 222 of the respective differential control drums 224, 226 so that ring gears 222 are rotated in the same direction by the stick and the control surface cables 236 from assemblies 224, 226 are moved in the same direction. Output cables 236 are connected to control surfaces 250, 252 in the same sense so that, through the system just described, control surfaces 250, 252 move together up and down responsive to movement of stick 216.

The rudder function system differs from the elevator function system in that the cables 228, 230 are wrapped around the sun gears 233 of the respective drums instead of the ring gears 222 with cable 230 wrapped clockwise and cable 228 wrapped counterclockwise. Thus, movement of the rudder pedal bar 219 produces rotation of the sun gears 233 simultaneously, but in opposite directions. Output cables 236 being wrapped in the same direction about pinion gear carrier 240, movement of rudder pedal bar 219 results in movement of one control surface 250, 252 up and movement of the other control surface down.

There is no feedback in this system. To demonstrate this, let it be assumed that control surfaces 250, 252 are locked. If stick 216 is moved, backward, cables 232, 234 are moved rotating ring gears 222 clockwise. Carriers 240 could not rotate if the control surfaces were locked, so sun gears 233 would have to turn counterclockwise. However, rotation of sun gears 233 counterclockwise would put both cables 228a and 230a under tension in directions opposing one another, and no movement could occur. This proves that feedback would not occur in the control cycle when control surfaces 250, 252 move responsive to the stick.

Both stick 216 and rudder pedal bar 219 can be operated simultaneously by differential action of epicyclic gear trains 224, 226. Assume that stick 216 is moved forward at the same time that rudder pedal bar 219 is rotated counterclockwise responsive to right rudder pedal. Cables 232, 234 would be pulled rotating ring gears 222 counterclockwise. Cable 242 would be pulled by the rudder pedal bar 219 to rotate sun gear 233 of train 224 clockwise, whereby the differential output to cable 236 from train 224 would be the resultant movement of carrier 240 and could be zero. Cable 230 would be pulled by the rudder pedal bar 219 to rotate sun gear 233 of train 226 counterclockwise, whereby the differential output to cable 236 from train 226 would be the resultant movement of carrier 224 and could not be zero.

Having thus specifically described my invention, I do not wish to be understood as limiting myself to the precise details of construction shown, but instead wish to cover those modifications thereof which will occur to those skilled in the art from my disclosure and which fall within the scope of my invention, as described in the following claims.

I claim:

1. An aircraft control system for a control surface on a wing operated by mechanical motion transmitting means from a first and a second control unit in the fuselage, said wing being pivotally mounted on said fuselage, comprising: epicyclic gear train means interposed in said motion transmitting means having input-output elements A, B, C, D and E, wing pivoting compensating means having an output motion responsive to wing pivoting relative to said fuselage, said compensating means being connected to said element A providing an input of motion to said train means to compensate for the tendency of said motion transmitting means to relatively move said wing and control surface responsive to wing pivoting, element B being connected to said control surface, a shifter mechanism having a first and a second pivotal means each connected to one of said control units and elements C and D being each connected to one of said pivotal means, said pivotal means being operable to transmit motion from said control units to said elements C and D and said shifter mechanism being shiftable between a first position in which only said first pivotal means is operative to transmit motion and a sec- position in which only said second pivotal means is operative to transmit motion, said shifter mechanism having intermediate positions between said first and second positions in which both pivotal means are operative to transmit motion, and said element E being connected to said shifter mechanism to shift said mechanism between said first and second positions automatically upon wing pivoting.

2. An aircraft control system for a control surface on a wing operated by mechanical motion transmitting means from a first and a second control unit in the fuselage, said wing being pivotally mounted on said fuselage, comprising: a first and a second epicyclic gear train interposed in series in said motion transmitting means, said first train having input-output elements A, B and C, said second train having input-output elements D, E and F, wing pivoting compensating means having an output motion responsive to wing pivoting relative to said fuselage, one of said gear trains having an additional input-output element G and said compensating means being connected to said element G providing an input of motion to the trains to compensate for the tendency of said motion transmitting means to relatively move said wing and control surface responsive to wing pivoting, element A being connected to said control surface, a shifter mechanism having a first and a second pivotal means each connected to one of said control units and elements B and D being each connected to one of said pivotal means, said pivotal means being operable to transmit motion from said control units to said elements B and D and said shifter mechanism being shiftable between a first position in which only said first pivotal means is operative to transmit motion and a second position in which only said second pivotal means is operative to transmit motion, said shifter mechanism having intermediate positions between said first and second positions in which both pivotal means are operative to transmit motion, said element C being connected to said element E, and said element F being connected to said shifter mechanism to shift said mechanism between said first and second positions automatically upon wing pivoting.

3. An aircraft control system for a controllable member on a wing opearted by mechanical motion transmitting means from a first and a second control unit in the fuselage, said wing being pivotally mounted on said fuselage, comprising: epicyclic gear train means interposed in said motion transmitting means having input-output elements A, B, C, D and E, wing pivoting compensating means having an output motion responsive to wing pivoting relative to said fuselage, said compensating means being connected to said element A providing an input of motion to said train means to compensate for the tendency of said motion transmitting means to relatively move said wing and controllable member responsive to wing pivoting, element B being connected to said controllable member, a shifter mechanism having a first and a second pivotal means each connected to one of said control units and elements C and D being each connected to one of said pivotal means, said pivotal means being operable to transmit motion from said control units to said elements C and D and said shifter mechanism being shiftable between a first position in which only said first pivotal means is operative to transmit motion and a second position in which only said second pivotal means is operative to transmit motion, and said element E being connected to said shifter mechanism to shift said mechanism between said first and second positions automatically upon wing pivoting.

4. The subject matter of claim 3 in which there is a motor in said wing pivoting compensating means operative to input motion to element A and to take output of motion from element A independently of wing pivoting whereby said controllable member can be controlled by operation of said motor without operation of said control units.

5. A control system for a controllable member on a first body operated by mechanical motion transmitting means from a first and a second control unit on a second body, said first body being pivotally mounted relative to said second body, comprising: epicyclic gear train means interposed in said motion transmitting means, having input-output elements A, B, C, D and E, pivoting compensating means having an output motion responsive to pivoting of said first body relative to said second body, said compensating means being connected to said element A providing an input of motion to said train means to compensate for the tendency of said motion transmitting means to relatively move said first body and controllable member responsive to pivoting of said first body, element B being connected to said controllable member, a shifter mechanism having a first and a second pivotal means each connected to one of said control units and elements C and D being each connected to one of said pivotal means, said pivotal means being operable to transmit motion from said control units to said elements C and D and said shifter mechanism being shiftable between a first position in which only said first pivotal means is operative to transmit motion and a second position in which only said second pivotal means is operative to transmit motion, and said element E being connected to said shifter mechanism to shift said mechanism between said first and second positions automatically upon pivoting of said first body relative to said second body.

6. The subject matter of claim 5 in which said first and second pivotal means each has a pivotal device mounted to pivot about a pivotal axis and each has means permitting relative shifting between said pivotal device and said pivotal axis from a first position to a second position, said first position being located relative to the points of connection of the associated control unit and input-output element so as to provide moment arms for transfer of motion and said second position being relative to one of said points of connection so as to provide substantially no moment arm for transfer of motion, said shifter mechanism being operable to shift said pivotal devices between said first and second positions.

7. The subject matter of claim 5 in which said mechanical motion transmitting means includes cables, said first body is an aircraft wing, and said second body is an aircraft fuselage.

8. The subject matter of claim 7 in which an engine is mounted on said wing, said engine has a propeller and said controllable member is a propeller pitch control.

9. The subject matter of claim 5 in which said system is an aircraft control system, and in which one of said control units includes an aircraft control stick and the other of said control units includes aircraft control rudder pedals.

10. An epicyclic gear train system interposed and transferring motion between a pair of units and a single unit, comprising: epicyclic gear train means having input-output elements A, B, C, D and E, element A being connected to said single unit for transfer of motion therebetween, a shifter mechanism having a first and a second pivotal means each connected to one of said pair of units and elements B and C being each connected to one of said pivotal means, said pivotal means being operable to transmit motion between said pair of units and said elements B and C and said shifter mechanism being shiftable between a first position in which only said first pivotal means is operative to transmit motion and a second position in which only said second pivotal means is operative to transmit motion, motion input means connected to said element D, and said element E being connected to said shifter mechanism to shift said mechanism between said first and second positions automatically upon input of motion to said element D by said motion input means.

11. An aircraft control system for a control surface on a wing operated by mechanical motion transmitting means from a control unit in the fuselage, said wing being mounted on said fuselage to pivot about a pivotal axis generally longitudinal of said wing and transverse of said fuselage, comprising: a three-gear epicyclic train interposed in said transmitting means having three pivotal input-output elements A, B and C, element A being connected to said control unit by said transmitting means to be pivoted thereby and element B being connected to said control surface by said transmitting means to pivot the control surface, wing pivoting compensating means having an output motion responsive to wing pivoting relative to said fuselage, and said compensating means being connected to element C providing an input of motion to said train compensating for the tendency of said motion transmitting means to relatively move said control unit and control surface responsive to wing pivoting.

12. The subject matter of claim 11 in which said transmitting means includes cables, in which said compensating means includes a linkage formed of rigid parts, and in which said linkage has interposed therein a trim motor for providing trim movement to said control surface independently of said control unit.

13. The subject matter of claim 11 in which there is a trim motor in said system operative to impart motion to one of said input-output elements independently of said control unit.

14. An aircraft control system for a controllable member on a body which is pivotally mounted relative to other aircraft structure, said controllable member being operated by mechanical motion transmitting means from a control unit in the aircraft fuselage, comprising: a three-gear epicyclic train interposed in said transmitting means having three pivotal input-output elements A, B and C, element A being connected to said control unit by said transmitting means to be pivoted thereby and element B being connected to said controllable member by said transmitting means to impart motion thereto, pivoting compensating means having an output motion responsive to pivoting of said body relative to said other aircraft structure, and said compensating means being connected to element C providing an input of motion to said train compensating for the tendency of said motion transmitting means to relatively move said control unit and controllable member responsive to pivoting of said body.

15. An aircraft control system for a controllable member such as a control surface operated by mechanical motion transmitting means to be used for more than one type of aircraft control including separate cable motion transfer means from a first and a second control unit that control the aircraft in different types of movements, such as elevator, rudder or aileron functions, that are operated concurrently or alternately, comprising: an epicyclic train interposed in said mechanical motion transmitting means, said train having at least three pivotal input-output elements A, B and C, element A being connected by said transmitting means to said first control unit, element B being connected by said transmitting means to said second control unit, and element C being connected by said transmitting means to said controllable member, whereby said controllable member will be operated for different types of aircraft control responsive to control motions of either of said control units or will be operated responsive to the differential in control motions of said control units operated concurrently, and means interposed in said mechanical motion transmitting means between said epicyclic train and said first and second control units controlling whether movement of said first control unit, said second control unit, or both control units is operable to produce motion in their respective input-output elements.

16. The subject matter of claim 15 in which one of said control units includes an aircraft control stick connected to one cable motion transfer means and the other of said control units includes aircraft control rudder pedals connected to another cable motion transfer means.

References Cited by the Examiner

UNITED STATES PATENTS 2,574,916 11/51 Gordon _____ 244—86
2,851,905 9/58 Clark _____ 74—675
2,936,968 5/60 Mazzitelli _____ 244—7

FOREIGN PATENTS 20,049 1911 Great Britain.

FERGUS S. MIDDLETON, *Primary Examiner.*

EMILE PAUL, MILTON BUCHLER, *Examiners.*